United States Patent Office

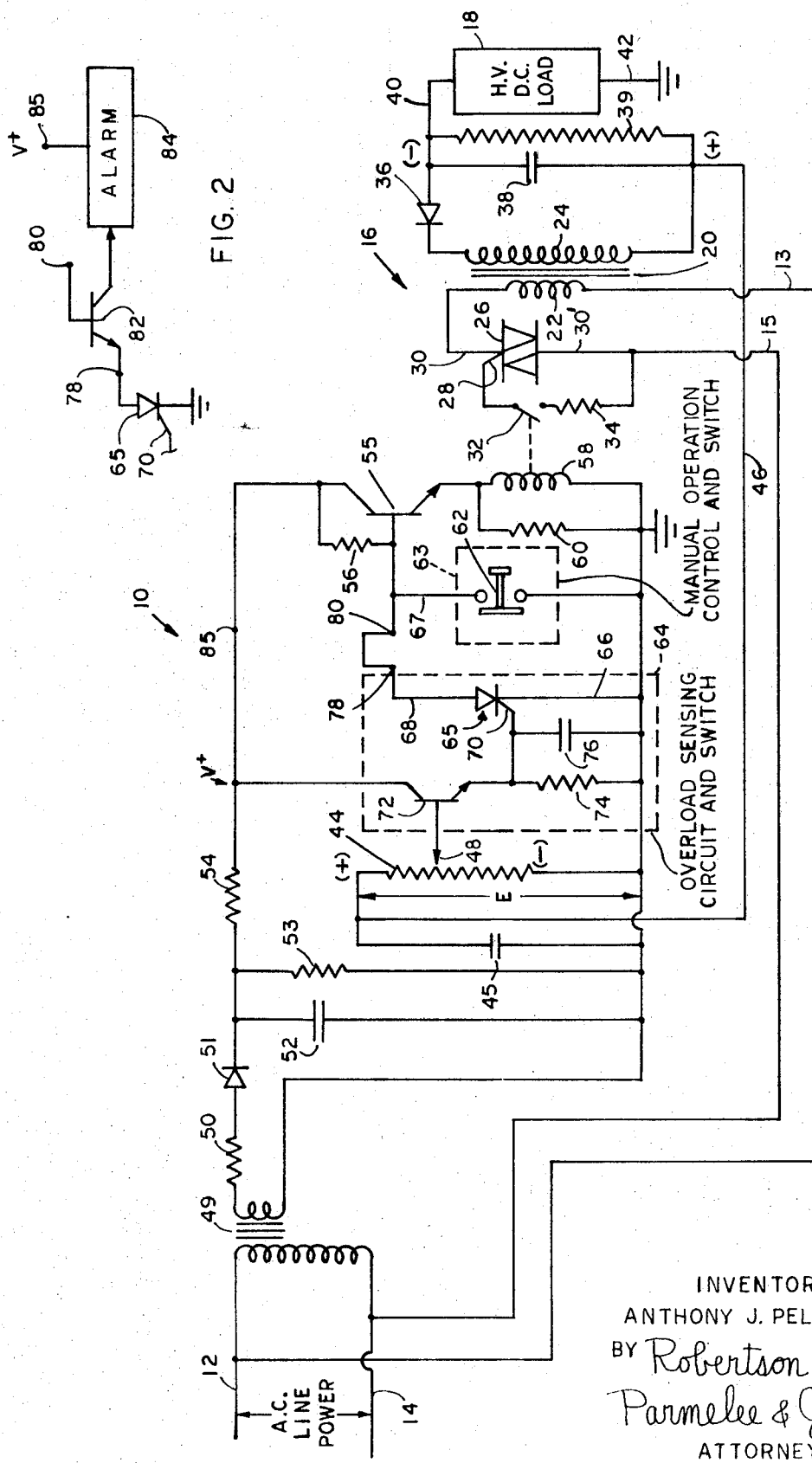

3,544,844
Patented Dec. 1, 1970

3,544,844
INTERLOCKED OPERATION CONTROL AND OVERLOAD PROTECTIVE CIRCUIT SYSTEM
Anthony J. Pellegrino, Brewster, N.Y., assignor to Hipotronics, Inc., Brewster, N.Y.
Filed July 11, 1969, Ser. No. 841,024
Int. Cl. H01h 47/04; H02h 3/20
U.S. Cl. 317—16                                            7 Claims

ABSTRACT OF THE DISCLOSURE

An interlocked operational control and overload protective circuit system is disclosed in which an overload sensing circuit and switch is connected in parallel interlocked relationship with a manually actuated control switch. When an overload occurs, the overload protective circuit automatically shuts off the flow of electrical power, and the interlocked arrangement prevents the reestablishing of electrical power flow until the operator has placed the manual control switch in the off position. When the operator again actuates the manual control switch, the flow of power is resumed, if the condition which caused the overload has been removed. The application of this system to protect high voltage utilization equipment, such as electrostatic spray equipment, flocking equipment, electrostatic dust precipitation and the like is described.

---

This invention relates to an interlocked operational control and overload protective circuit system wherein operational control of a tool is selectively interlocked with an overload protection circuit.

In the supply of electrical power to a tool load, such as an electrostatic paint spray tool, a flocking tool, an electrostatic dust precipitator or other high voltage utilization device, overload protection is often desired to maintain proper operation, to protect personnel, and to prevent damage to the tool as well as the electrical power supply. For instance, electrostatic spray painting tools employ high voltages to place electric charges on the paint droplets for attracting them from the spray painting tool toward a workpiece to be painted. When spray painting is conducted by holding the tool or gun at too close a distance to the workpiece increased current flow or corona electric discharges may arise imposing an excessive current drain on the high voltage supply, accompanied with an unduly large drop in the electrostatic voltage available for charging the droplets in the painting process. The current discharge is likely to damage the tool power supply as well as to interfere with the process. The discharge current resembles a power overload condition which may be reduced to its proper level by reestablishing the proper distance between the spray painting tool and the workpiece. However, before such corrective step may be completed, the overload protection circuit associated with the high voltage supply for the spray painting tool, has taken over control and effectively shut off the high voltage from the spray gun.

Among the advantages of the system of the present invention are those resulting from its ability to quickly and simply resume normal tool operation following shutdown initiated by a sensed overload condition.

A particular advantage of the circuit and system embodying this invention resides in its ease of re-establishing the high voltage to the utilization device, such as a spray painting tool, following an overload condition which provides for convenient and efficient control over the utilization device and thus assuring that proper voltage conditions are maintained whenever the device is in operation.

With the circuit in accordance with the invention a high voltage utilization tool is controllably provided with electrical power. The circuit includes overload protection that is arranged in preselected operative manner with an operation control whereby the operator of the tool may quickly and simply reactivate the tool after it has been disabled by a sensed electrical overload.

An illustrative system which encompasses the invention includes an operational control and switch for the manual control of power flow from a source to a tool, and an overload sensing circuit and switch connected in effective parallel relationship with the manual operational control and switch. The overload sensing circuit and switch is actuated in response to the sensing of a current flow in the tool load in excess of a predetermined value and automatically causes an immediate termination of the power flow even though the manual operation control and switch remain in the power flow enabling position. The overload sensing circuit and switch and the manual control are so interlocked that the placement of the manual operation control switch in the non-power or "off" position effectively disables the overload sensing circuit and switch thereby permitting a resumption of normal operation of the tool by actuation of the manual operation control and switch, if the condition which caused the overload current drain has been removed.

The various features, objects and advantages may be more fully understood from a consideration of the following description of illustrative embodiments incorporating the invention in conjunction with the accompanying drawings wherein FIG. 1 is a schematic electrical circuit diagram of an interlocked operational manual control and overload protective circuit system embodying the invention; and FIG. 2 is an electrical schematic diagram of an alternative embodiment incorporating features of the invention.

With reference to FIG. 1, an electrical schematic circuit diagram for an interlocked operational control and overload protection circuit 10 is shown connecting alternating current (A.C.) line power from a source represented by the A.C. power lines 12 and 14 to an output circuit generally indicated at 16 for supplying a high voltage direct current (D.C.) utilization load 18 which, for example, may be an electrostatic spray painting tool. The output circuit 16 includes a step-up transformer 20 having a primary winding 22 and a secondary winding 24 to generate a high voltage A.C. to be rectified and applied as high voltage direct current (H.V.D.C.) to the tool load 18. The primary winding 22 is connected through an electronically controllable switch 26, such as a triac, and by leads 13 and 15 to the input A.C. power lines 12 and 14. The electronic switch 26 includes a control electrode 28 and a pair of power electrodes 30 and 30'. The power electrodes 30–30' are effectively connected in series with the primary winding 22 and one of the A.C. power leads, namely lead 15, and the control electrode 28 is connectable to the power electrode 30' and to the same lead 15 through a relay-controlled switch 32 and a current-limiting resistor 34.

When the control electrode 28 is electrically connected by closure of switch 32 to the power electrode 30', the electronic switch 26 is closed i.e. is rendered electrically conducting, and when the relay switch 32 is opened, the electronic switch 26 is correspondingly opened, i.e. is rendered non-conducting. The selective control of the relay-actuated switch 32 thus controls the passage of electrical power from the A.C. power lines 12–14 to output circuit 16 and hence to the load 18. In the illustrative embodiment of FIG. 1 the load 18 requires a large negative D.C. supply voltage which is obtained by a rectifier diode 36 and filter capacitor 38 connected in series across the secondary winding 24 of the transformer 20. There is a high resistance bleed-off resistor 39 connected across the capacitor 38 for removing the charge therefrom when the utilization circuit is shut off.

It will be understood that the particular arrangement shown in FIG. 1 for the output circuit 16 and utilization device 18 may vary, depending upon the particular application, e.g. such as for electrostatic paint spray systems, electrostatic flocking systems for applying decorative flocking, electrostatic dust precipitators, and similar H.V.D.C. utilization devices.

The high negative D.C. voltage produced at the output of the rectifier 36 and filter capacitor 38 is supplied to an electrostatic spray painting tool included in the load 18 and produces a direct current flow through the lead 40, and through a ground connection 42. The direct current flow path continuous through a potentiometer 44 and through a return lead 46 back to the other side of the capacitor 38. The potentiometer 44 is shunted by a filter by-pass capacitor 45 for the purpose of bypassing ripple components of the voltage to ground.

Thus, during normal operation a voltage signal E representative of the electrical power being delivered to the load 18 is produced across the potentiometer 44. Particularly, in the arrangement shown, the current being fed to the load is sensed so that the voltage signal E across the potentiometer 44 is proportional to the load current flow. This potentiometer is used to adjust the over-all sensitivity of the circuit, and a wiper contact arm 48 of the potentiometer 44 couples an adjustable portion of the voltage E into an overload protection circuit operating in a manner as will be described.

The circuit 10 is energized from the A.C. power lines 12 and 14 through a transformer 49 and includes a current-limiting resistor 50, a diode rectifier 51 and a filter capacitor 52. This filter capacitor is shunted by a bleed-off resistor 53 and supplies a positive D.C. supply voltage labelled V+ at the output of a current-limiting resistor 54. The D.C. supply voltage is supplied across the collector and emitter of an NPN transistor 55. This transistor 55 is normally biased into the conduction state by a resistor 56 connected between the collector and base electrodes of transistor 55. The emitter of the transistor 55 is coupled through a relay coil 58 to ground. A resistor 60 is placed across the coil 58 to damp transients when current through the coil 58 is interrupted. The relay coil 58 controls the operative position of the switch 32 in the output circuit 16. Hence, the energization of the relay coil 58 results in the closure of the switch 32 followed by the closure of the electronic switch 26 for the application of electrical power to the load 18.

Control of the current to the relay coil 58 by control of the normally-conducting transistor 55 is obtained by placing an operation control and switch 62 in the form of a normally closed push button switch across the base to emitter junction of the transistor 55 and the relay coil 58.

The operator controls the tool by a suitable control 63, such as a trigger-operated valve or the like for controlling fluid flow, and in operating the control 63 he affects the position of the push button switch 62 which is preferably placed in the tool adjacent to the control 63. When the tool is being operated normally, the switch 62 is depressed, and thus the shorting path provided by the switch 62 between the base of transistor 55 and ground is opened, and hence the transistor 55 is rendered conductive. As previously mentioned, conduction of transistor 55 enables the application of electrical power to the tool load 18.

However, when the operator releases the control 63, the operational control responsive switch 62 becomes closed, and it effectively shorts the base to emitter junction of transistor 55 so that the current through the coil 58 drops to a level that effectively de-energizes the relay coil 58 causing switch 32 to be opened. As previously explained, the opening of switch 32 results in the opening of the electronic switch 26 immediately terminating power flow from the A.C. lines 12–14 to the tool load 18.

In effective parallel relationship across the operation control responsive switch 62 is an overload sensing circuit, generally indicated at 64. This overload sensing circuit includes a silicon controlled rectifier 65 (SCR) having its power electrodes 66 and 68 connected directly across the switch 62. The SCR is provided with a control electrode 70 which is connected to an electrical signal from an NPN amplifying transistor 72. The base of the transistor 72 is directly connected to the wiper contact arm 48 of the potentiometer 44, and its collector is connected to the power supply voltage V+. The emitter of transistor 72 is coupled to ground through a resistor 74, and A.C. signals are coupled to ground through a capacitor 76 to prevent inadvertent actuation of the circuit 64 due to transients.

In the operation of the overload sensing circuit 64, the load current passing through the potentiometer 44 produces a voltage with a polarity as indicated. When this voltage as sensed at the wiper contact 48 attains a value above a preselected amount, a voltage across the resistor 74 is produced by transistor 72 of a magnitude sufficient to trigger the SCR 65 into conduction. Conduction by the SCR 65 effectively places the base of transistor 55 at ground potential, similar in effect to closure of the switch 62, to thereby terminate the flow of power from the lines 12–14 to the tool load 18.

As soon as the SCR has been rendered conductive its exciting voltage as applied to the gate 70 disappears, because this exciting voltage was derived from load current passing through the potentiometer 44. However, the SCR exhibits a latching characteristic whereby it maintains its own conduction between the power electrodes 66–68 independent of the voltage applied to its gate electrode 70. As a result, current passing through resistor 56 and the SCR 65 maintain the load 18 effectively disconnected from the line power.

Assume, for instance, that an operator spaces the spray painting tool too close to the workpiece being painted, whereby an excessive current drain is detected and recognized by the overload protection circuit as an overload condition. The overload sensing circuit 64 rapidly responds to shut off the electrical power. The operator may quickly resume normal operation, after proper spacing of the tool away from the workpiece, by releasing the control 63, thus shutting off the flow of fluid, e.g. paint, and thus allowing the operating control responsive switch 62 to return to the off, i.e. closed position. This closure of switch 62 effectively short circuits the SCR, terminating the latter's conduction.

Resumption of normal power transmission from the line to the load 18 is conveniently obtained by the simple action of again actuating the control 63 to turn on the fluid flow and to reopen switch 62. The operator of the tool utilizing the circuit described in relation to FIG. 1 may thus with a single push button operator control switch 62 control both the application of power to the load 18 as well as reset the overload circuit 10.

The flow of current through the SCR thus is an indication of the existence of an overload condition. FIG. 2 illustrates an alternative embodiment which may be conveniently employed to indicate a sensed overload condition by actuating an alarm. The electrical connection between the power electrode 68 and the junction of lead 67 connected to the switch 62 and the base of transistor 55 is interrupted at connecting points 78 and 80. An NPN transistor 82 is placed between the junctions 78–80 in a manner as illustrated in FIG. 2 wherein the emitter of transistor 82 is connected to the point 78 and its base is connected to the point 80. The collector of transistor 82 is connected to an alarm circuit which is also connected to the positive supply V+ at a connection point 85. The alarm 84 may be a lamp or buzzer or other suitable overload indicating device. The operation of the overload protection circuit 10 is not in any way altered by the insertion of transistor 82, and the effective parallel connection between the overload sensing circuit 64 and the operation control responsive switch 62 remains as previously described.

What is claimed is:

1. An interlocked operational control and overload protective circuit system for automatically shutting off the electrical power delivered from an electrical source to a utilization load in response to an overload condition and for reestablishing the electrical power comprising load switch means electrically interposed between the source and the load for interrupting and passing power flow therebetween, means for sensing the electrical power delivered by the source to the load to produce a power signal representative of the electrical power being delivered, an overload sensing circuit responsive to the power signal and operatively coupled to the load switch means for opening and closing thereof in correspondence with sensed delivered electrical power, said overload sensing circuit including in effective parallel relationship therewith a manual operational control switch, the opening of said manual operational control switch being effective to arm the overload sensing circuit and to enable power to flow through the load switch means from the source to the load, and the closure of said manual operational control switch being effective to disable the overload sensing circuit and to open the load switch means.

2. An interlocked operational control and overload protection circuit system for automatically shutting off the electrical power delivered from an electrical source to a utilization load in response to an overload condition and for reestablishing the electrical power as claimed in claim 1 in which said manual operational control switch is a normally closed switch which is manually opened when said utilization tool is placed in operation, and said overload sensing circuit includes an electronic switch which is rendered conductive in response to an overload condition, said electronic switch being connected in parallel relationship with said manual operational control switch for automatically shorting said manual operational control switch when an overload condition is present, and said manual operational control switch shorting said electronic switch when said utilization tool is manually shut off.

3. An interlocked operational control and overload protective circuit system for automatically shutting off the electrical power delivered from an electrical source to a utilization load in response to an overload condition and for reestablishing the electrical power as claimed in claim 2, in which said system includes a relay coil for controlling the operation of said load switch means, a transistor in series with said relay coil for controlling the current flow through said relay coil, and said manual operational control switch and said electronic switch both being effectively shunted across said transistor and relay coil.

4. An interlocked operational control and overload protection circuit system for automatically shutting off the electrical power delivered from an electrical power source to a utilization load in response to an overload condition and for reestablishing the electrical power as claimed in claim 2 in which an alarm device is connected in circuit with said electronic switch, said alarm device being actuated when said electronic switch is rendered conductive when an overload condition is present.

5. An interlocked operational control and overload protective circuit system for automatically shutting off the electrical power delivered from an electrical source to a utilization load when an overload condition occurs and for reestablishing the electrical power comprising load power switching means electrically interposed between the source of electrical power and the utilization load for interrupting and passing power flow therebetween, relay means for controlling said load power switch means, manual operational control means for controlling said relay means during normal operation of said utilization tool, means for sensing the electrical power delivered by the source to the load and arranged to produce a power signal representative of the electrical power being delivered to the load, an overload sensing circuit responsive to the power signal and operatively coupled to said relay means for controlling the load power switching means, said overload sensing circuit being in effective parallel relationship with said operational control switch to activate said relay when the power in the load exceeds a predetermined value, said overload sensing circuit and said manual operational control switch being arranged to arm the interlocked system when said manual operational control switch is open with power being delivered to the load and to deactivate said overload sensing circuit upon closure of said manual operational control switch.

6. An interlocked operational control and overload protective circuit system adapted for use in high voltage utilization equipment such as electrostatic spray equipment, flocking equipment, electrostatic dust precipitators, and the like for automatically shutting off the high voltage electrical power delivered from an electrical source to a utilization load in response to an overload condition and for reestablishing the electrical power comprising a step-up transformer for providing high voltage to the utilization load and having a primary winding, load switch means connected in series with said primary winding for interrupting and passing power flow to the primary winding, means for sensing the electrical power delivered by the transformer to the load to produce a power signal representative of the electrical power being delivered, an overload sensing circuit responsive to the power signal and operatively coupled to the load switch means for opening and closing thereof in correspondence with sensed delivered electrical power, said overload sensing circuit including in effective parallel relationship therewith a manual operational control switch, the actuation of said manual operational control switch being effective to arm the overload sensing circuit and to enable power to flow through the load switch means to the primary winding and the release of said manual operational control switch being effective to disable the overload sensing circuit and to open the load switch means.

7. An interlocked operational control and overload protective circuit system adapted for use in high voltage utilization equipment, as claimed in claim 6 in which said overload sensing circuit has a latching characteristic serving to maintain the overload sensing circuit disabled and maintain the load switch means in open condition until said manual operational control switch is released and re-actuated.

References Cited
UNITED STATES PATENTS

| | | | |
|---|---|---|---|
| 3,211,958 | 10/1965 | Miller et al. | 317—54X |
| 3,214,642 | 10/1965 | Baude | 317—54 |
| 3,397,350 | 8/1968 | Garzon | 317—54X |
| 3,421,051 | 1/1969 | Six | 317—33X |

JAMES D. TRAMMELL, Primary Examiner

U.S. Cl. X.R.

307—252; 317—31, 33, 54, 148.5, 154; 340—253